June 14, 1932. T. F. GITHENS ET AL 1,863,046
EXTRACTOR
Filed July 11, 1931
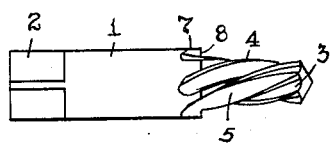
Fig. 1
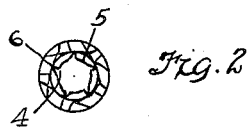
Fig. 2
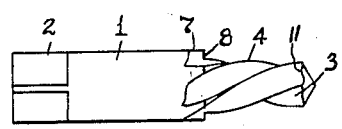
Fig. 3
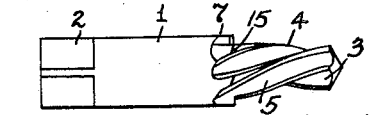
Fig. 11
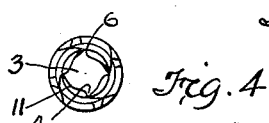
Fig. 4
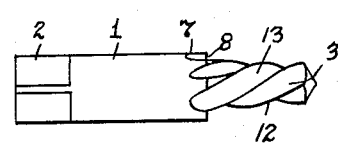
Fig. 5
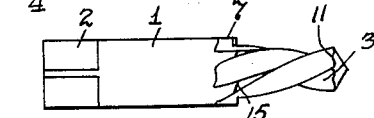
Fig. 12
Fig. 6
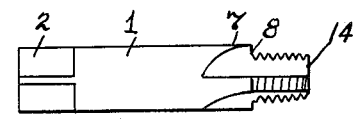
Fig. 7
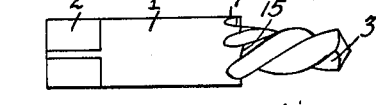
Fig. 13
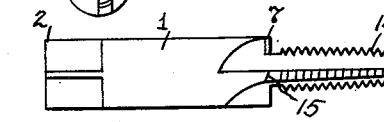
Fig. 8
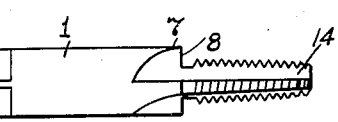
Fig. 9
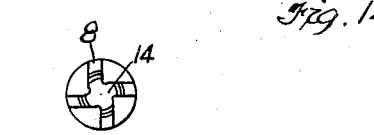
Fig. 14
Fig. 10
INVENTORS
Thomas F. Githens and
BY Joseph V. Emmons.
Fay, Oberlin & Fay
ATTORNEYS.

Patented June 14, 1932

1,863,046

UNITED STATES PATENT OFFICE

THOMAS F. GITHENS, OF CLEVELAND HEIGHTS, AND JOSEPH V. EMMONS, OF SHAKER HEIGHTS, OHIO, ASSIGNORS TO THE CLEVELAND TWIST DRILL COMPANY, OF CLEVELAND, OHIO, A CORPORATION OF OHIO

EXTRACTOR

Application filed July 11, 1931. Serial No. 550,138.

This invention relates to extractors for threaded metal parts and has more particular reference to tools employed for removing parts of pipes, screws, etc. which have been twisted or broken off, leaving a portion threaded into an aperture without a projection which will permit the part to be removed by ordinary tools.

Tools of the above described character have been made in various forms giving more or less success in the removal of broken parts, the usual method of removal being to drill a hole in the broken article and then force the operating part of the tool, which is provided with gripping means, into the provided hole. Continued turning of the extracting tool in the opposite direction to the thread on the broken part, then effects removal. The present invention aims to provide an extracting tool comprising a combination of features cooperating to produce a tool with improved operating characteristics.

It is, accordingly, an object of the present invention to provide an extracting tool which is more efficient than those now in use. Another object of the invention is to provide an extracting tool having improved operating characteristics. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but a few of various mechanical forms in which the principle of the invention may be used.

In said annexed drawing:

Figs. 1, 3, 5, 7 and 9 are side elevations of modifications of the improved extracting tool characterized by the presence of a straight shoulder thereon adjacent the operative part of the tool; Figs. 2, 4, 6, 8 and 10 are corresponding end views of the tools shown in Figs. 1, 3, 5, 7 and 9, respectively; and Figs. 11, 12, 13 and 14 are side elevations of still other modifications of the improved tool, characterized by the presence of biting means on the shoulders thereof.

Referring to Fig. 1, the modification there shown consists of an extracting tool having a body portion 1 with a squared end 2 for the application of a wrench, bit brace, or other turning means, and a tapered operating portion 3. This operating portion is provided with helically disposed lands or ribs 4 and intermediate grooves or flutes 5, these grooves running off into the body of the tool. As may be seen by reference to Fig. 2, the lands or ribs 4 are prepared with gripping or cutting edges 6, the forward face of the rib being approximately radially disposed. This modification may also be made up with the forward face inclined toward the work, the land or rib having, in such instance, an overhanging contour in cross-section, or having what is known to the tool maker as a positive rake. An extracting tool formed with gripping or cutting edges of this character readily bites into or grips the walls of a hole previously drilled into the piece to be extracted, but without cutting off chips or otherwise removing the metal of the hole. On the body portion 1 of the tool there is provided, adjacent the operating portion 3, a straight shoulder 7, the face of which is perpendicular to the longitudinal axis of the tool. This face 8 is adapted to be drawn down against the surface of the part to be extracted when the operating portion 3 has been forced into the provided hole and thus clamps the tool in the part so that further turning is directed toward twisting the part out of engagement with its seat. By making the operating portion 3 tapered, some variation in the size of a drilled hole may be allowed for and still secure tight engagement, while the straight shoulder insures that all the force of the turning moment after the tool has been sunk in place will be directed toward removing the broken part.

The modification of the new extracting tool shown in Fig. 3 is similar to that shown in Fig. 1 with the addition of helically disposed ridges 11 between the helical ribs 4. These ridges prevent the gripping or cutting edges from penetrating too deeply and expanding the hole in the broken part. Also, the ridges are placed behind the gripping or cutting edges to support these against being broken off. This modification is likewise provided with a straight shoulder 7 having a face 8 to engage the work when the tool has been fully sunk.

In each of the modifications shown in Figs. 1 and 3, particularly as seen in the end views 2 and 4, the gripping or cutting edges have forward faces with from approximately a zero rake, as in the case where this face is radial, to a positive rake where the face has an overhanging contour. This feature causes a larger part of the torque applied to the tool to be transmitted to the work as a tangential force, there being a very small outward or radial component tending to force the metal of the broken part outward and thus fix it more tightly in place. This is a feature not found in tools heretofore used except that described in the copending application Serial No. 548,546, filed July 3, 1931. In extracting tools as previously made, with this exception, the lands or ribs have been formed with a negative rake, i. e., so that the forward surface of the ribs sloped ahead of a radial line drawn to the gripping or cutting edge. The result of this was that the lands or ribs had a large outward or radial component and a small tangential component, thus forcing the gripping or cutting edges to expand the hole instead of unscrewing the object to be removed. In the two modifications of the present invention described above, most of the work done is directed toward securing a good turning moment on the work, whereafter the straight shoulder provided cooperates to effect an easy and efficient removal of the broken part. Referring particularly to the modifications shown in Figs. 3 and 4, the ridges 11 there provided are disposed directly behind the gripping or cutting edges, thus tending to strengthen by their convexity these edges against the shearing action of the tangential force while, at the same time, preventing these edges from penetrating too deeply and thus expanding the provided hole.

The modification shown in Figs. 5 and 6 is also provided with the shoulder 7 having the work-engaging face 8 but, in this case, the operating part 3 is provided with spiral ribs 12 and flutes 13. When these spiral ribs are entered into the hole in the broken screw, pipe, etc., a secure engagement is obtained although the efficiency may not be so great as in the previously described modifications. The shoulder 7 then bears upon the surface of the part and the entire force of the turning movement is exerted to remove the piece.

Figs. 7 and 9 together with corresponding end views shown in Figs. 8 and 10 illustrate still further modifications of the invention in which the straight shoulder 7 with faces 8 perpendicular to the longitudinal axis of the tool cooperate with a thread-forming means 14 which is of approximately uniform diameter as shown in Fig. 7 and which is tapered as shown in Fig. 9. Either modification is inserted into a hole provided in the part to be extracted where it cuts a thread in the hole to secure engagement with the part and the faces 8 of the cooperating shoulder 7 are eventually drawn down against the part so that further turning serves to unscrew the part. So far as we are aware, no extracting tool has heretofore been described having thread-cutting means cooperating with a straight shoulder for securing a turning moment on the work.

The modification shown in Fig. 11 consists of an operating portion 3 similar to that shown in Fig. 1 having rake-shaped ribs 4 and grooves 5. In this case, the shoulder 7 is provided with biting means 15 having faces at an angle to the longitudinal axis of the tool so that, when the operating portion 3 has fully penetrated into the provided hole, these biting means 15 bite into the surface of the broken part to further grip the work and secure such a firm hold thereon that, in cooperation with the ribs 4, the broken part must yield to the force supplied and become unscrewed from its socket. Similarly, in the modification shown in Fig. 12, a shoulder 7 on the body 1 has biting means 15 which cooperate with an operating portion 3 having rake-shaped ribs and interspaced helically disposed ridges 11 corresponding to the operating portion of the tool shown in Fig. 3. Here again, biting means 15 bite into the top surface of the broken part and cooperate with the operating portion 3 to secure a firm grip on the part, whereupon removal of the part follows upon further turning of the tool. Fig. 13 discloses a modification, the operating portion 3 of which corresponds to that shown in Fig. 5 but, in which the shoulder 7 has biting means 15 which bite into the surface of the work as described above in connection with the modifications shown in Figs. 11 and 12.

Fig. 14 illustrates a modification of the new extracting tool having a tapered thread-forming portion 14 similar to that shown in Fig. 9 with which cooperates the shoulder 7 having biting means 15 thereon to grip the surface of the broken part when the thread-forming means 14 has fully entered the hole provided.

The above described modifications of the new extractor tool comprise a combination of features not found in tools previously used, the straight shoulder 7 with perpendicular faces 8 or with biting means 15 cooperating with variously formed operating portions 3 or 14 adapted to enter a previously drilled hole, to the end that the broken part, such as a screw or a threaded pipe, can be easily and efficiently removed from its seat. The shoulder illustrated with locking surface or biting means aids in gripping the work, which may often be rusted or jammed into position, so that the combined engagement of the entering operating portion and shoulder or biting means permits all of the force exerted on the tool by a wrench or other means applied to the squared end 2, to be applied to the removal of the broken part.

Other modes of applying the principle of our invention may be employed instead of the one explained, change being made as regards the mechinsm herein disclosed, provided the means stated by any of the following claims or the equivalent of such stated means be employed.

We therefore particularly point out and distinctly claim as our invention:

1. An extracting tool comprising a body portion, a shoulder on the forward end of said body portion equipped with serrations adapted to engage an object to be removed without chipping metal, an entering portion integrally united to said body portion, and lands on said entering portion formed by flutes which continue into said shoulder and provide said serrations.

2. An extracting tool comprising a body portion, a shoulder on the forward end of said body portion equipped with biting means adapted to engage an object to be removed without chipping metal, an entering portion integrally united to said body portion, and lands on said entering portion formed by flutes which continue into said shoulder and provide said biting means.

3. An extracting tool comprising a body portion, a shoulder on the forward end of said body portion equipped with serrations adapted to engage an object to be removed without chipping metal, an entering portion integrally united to said body portion, and lands on said entering portion provided with forward faces of at least zero rake, said lands formed by flutes which continue into said shoulder and provide said serrations.

4. An extracting tool comprising a body portion, a shoulder on the forward end of said body portion equipped with serrations adapted to engage an object to be removed without chipping metal, an entering portion integrally united to said body portion, and lands on said entering portion provided with forward gripping edges and rearwardly adjacent ridges limiting the penetration of said edges, said lands formed by flutes which continue into said shoulder and provide said serrations.

5. An extracting tool comprising a body portion, a shoulder on the forward end of said body portion equipped with serrations adapted to engage an object to be removed without chipping metal, an entering portion integrally united to said body portion, and lands on said entering portion provided with forward gripping edges of at least zero rake and rearwardly adjacent ridges limiting the penetration of said edges, said lands formed by flutes which continue into said shoulder and provide said serrations.

6. An extracting tool comprising a body portion, a shoulder on the forward end of said body portion equipped with serrations adapted to engage an object to be removed without chipping metal, a tapered entering portion integrally united to said body portion provided with chip cutting teeth and axially extending lands, said lands formed by flutes which continue into said shoulder to provide said serrations.

Signed by us this tenth day of July, 1931.

THOMAS F. GITHENS.
JOSEPH V. EMMONS.